Oct. 3, 1939.   C. Z. SUTTON   2,174,539
DISPENSING MACHINE
Filed Oct. 18, 1937    6 Sheets-Sheet 3
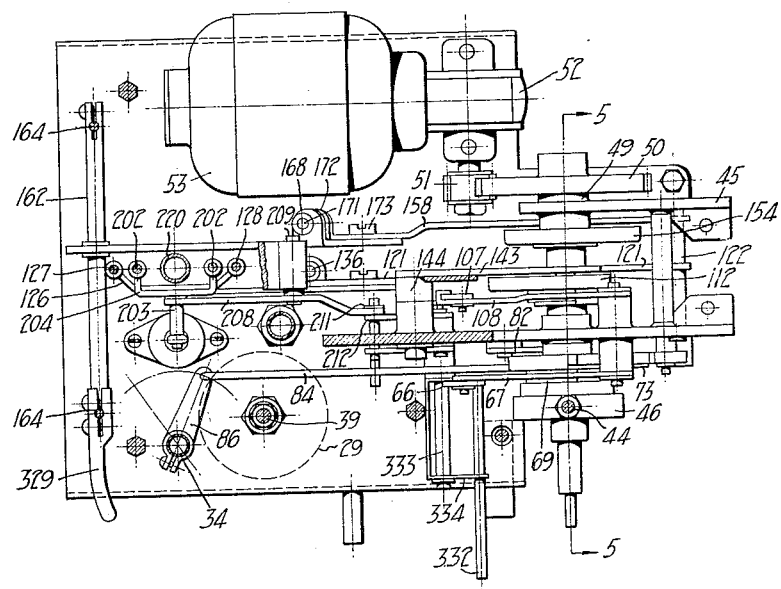
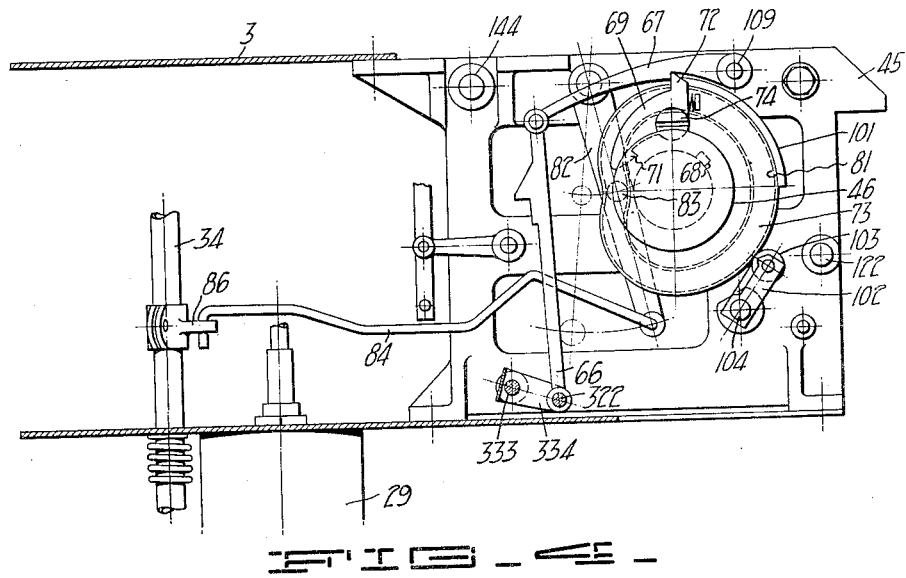
INVENTOR.
Charles Zook Sutton
BY Marcus Lothrop
ATTORNEY.

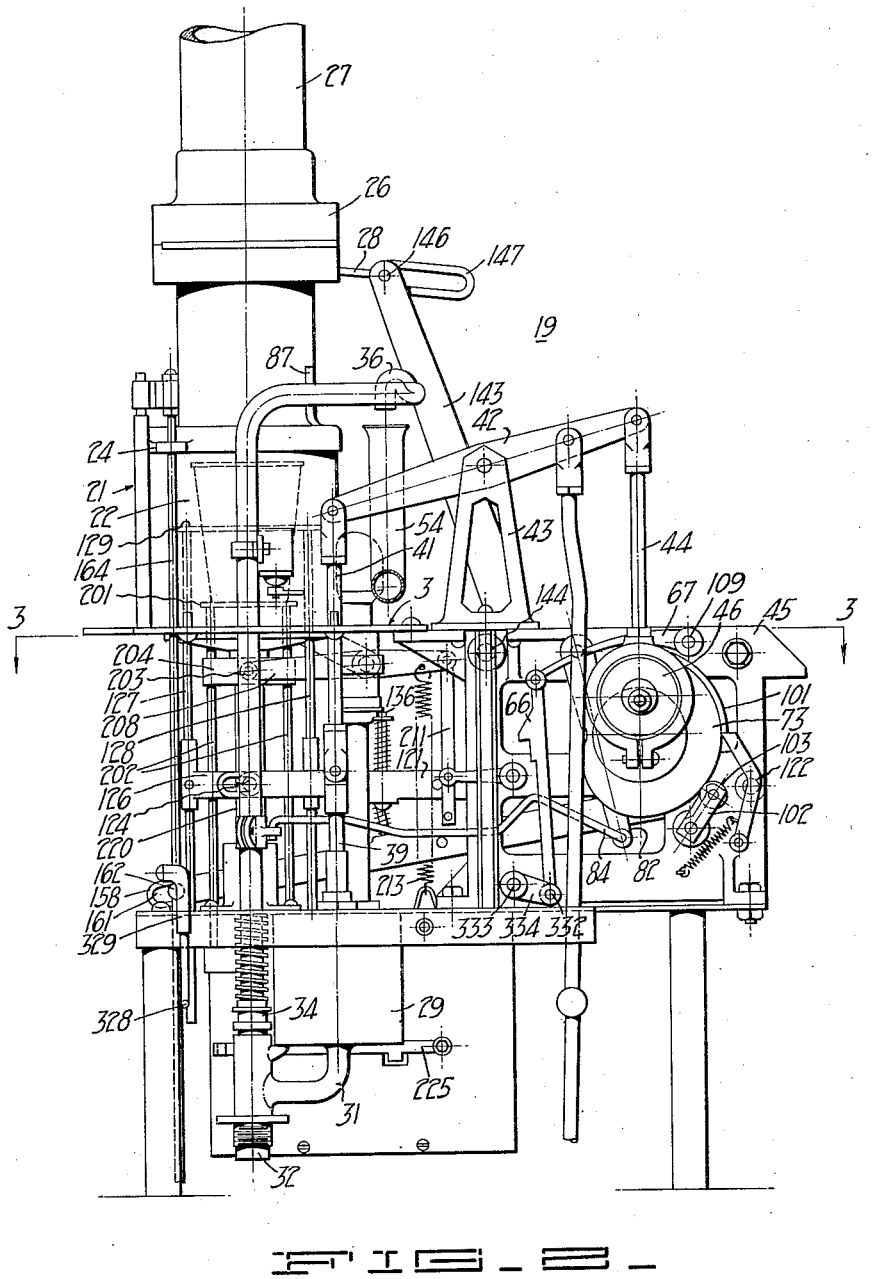
FIG_2

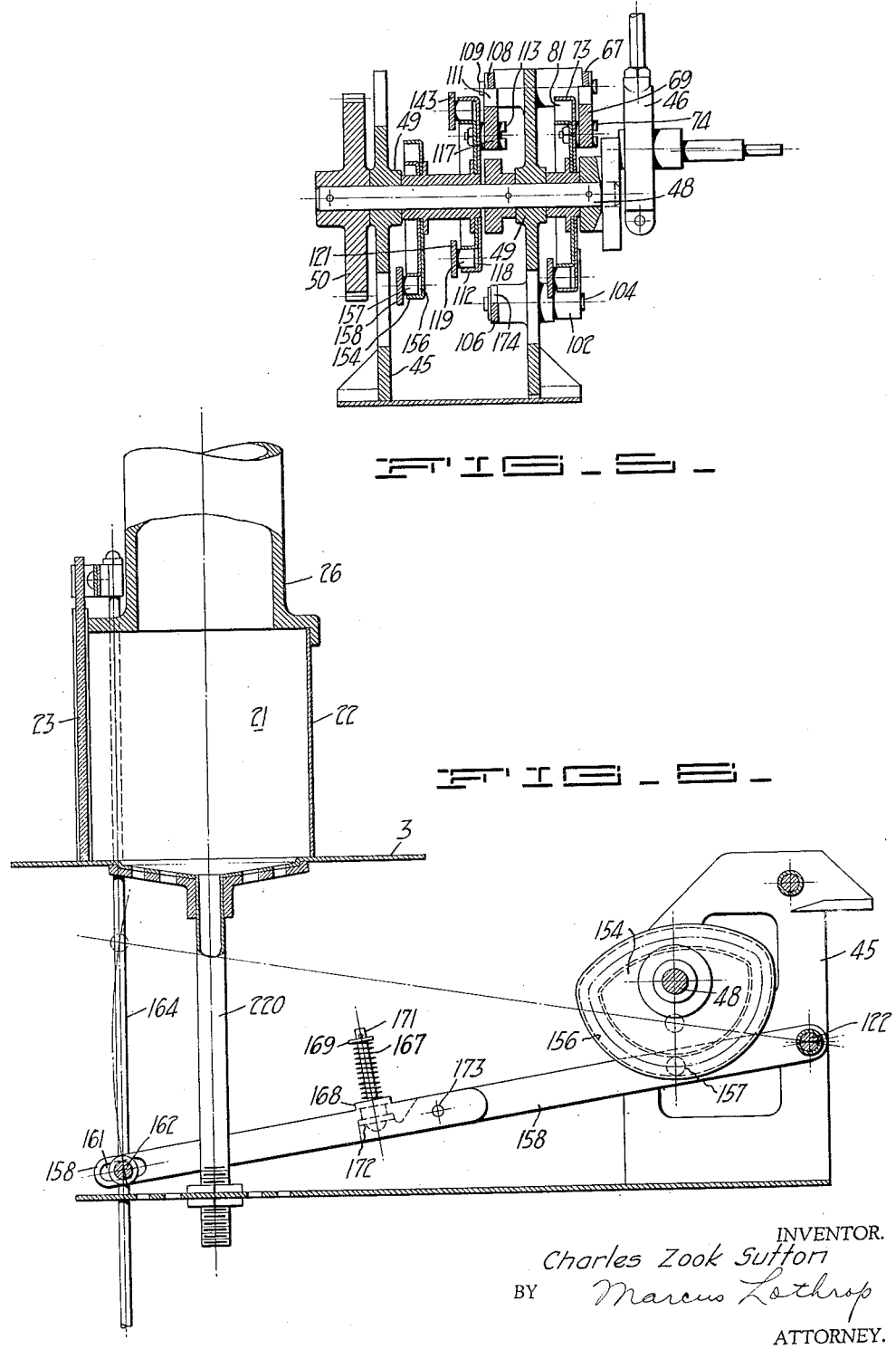

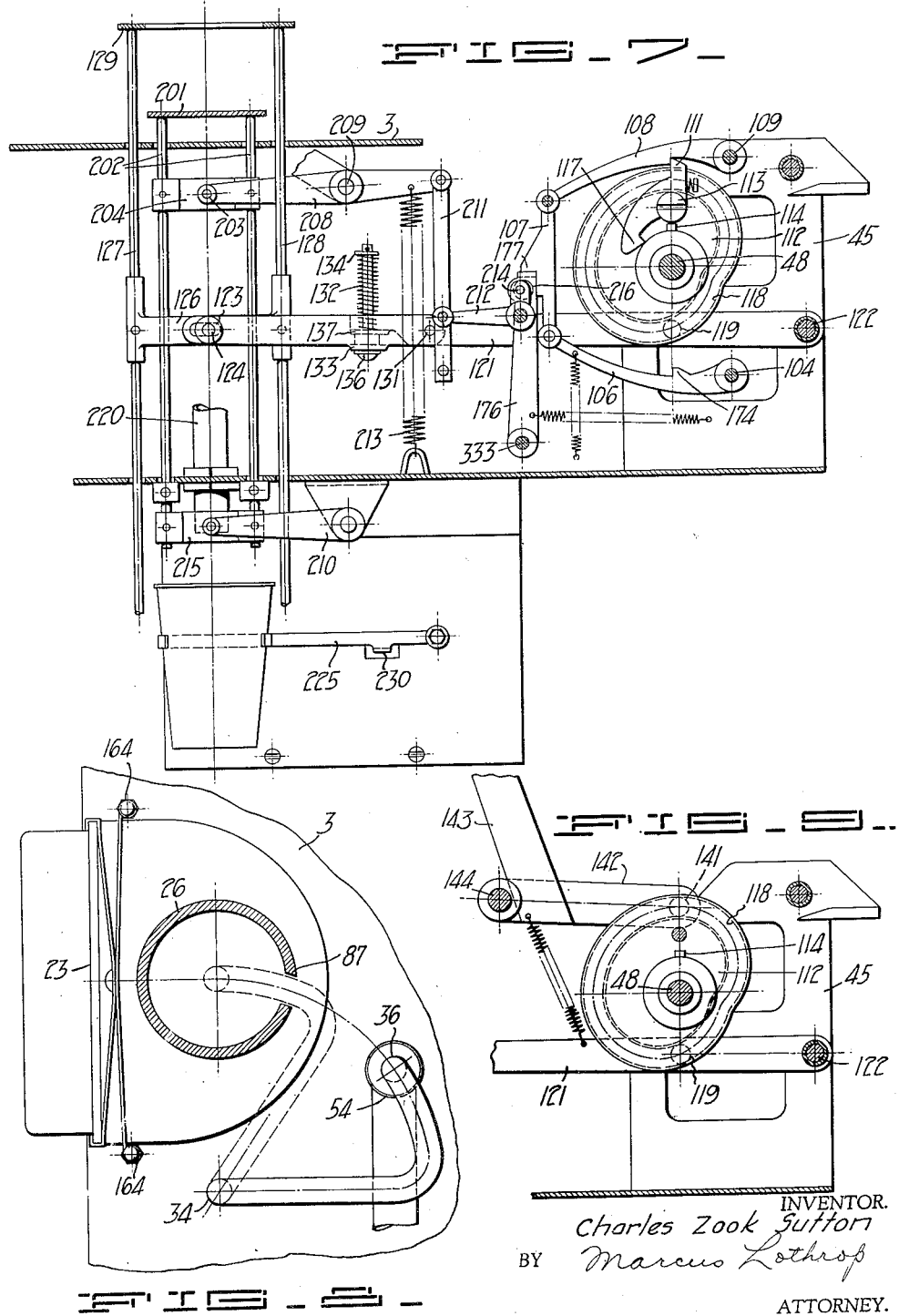

Oct. 3, 1939.  C. Z. SUTTON  2,174,539
DISPENSING MACHINE
Filed Oct. 18, 1937   6 Sheets-Sheet 6
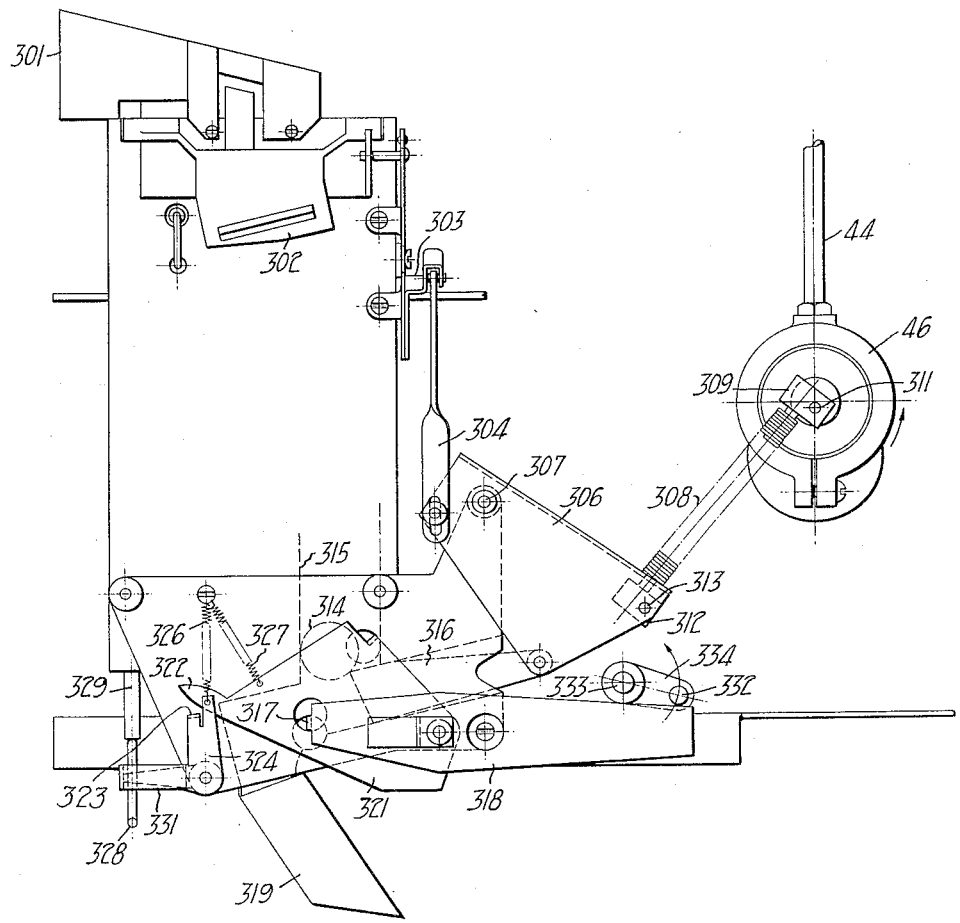
FIG_10_
INVENTOR.
Charles Zook Sutton
BY Marcus Lothrop
ATTORNEY.

Patented Oct. 3, 1939

2,174,539

UNITED STATES PATENT OFFICE 2,174,539

DISPENSING MACHINE

Charles Zook Sutton, Piedmont, Calif.

Application October 18, 1937, Serial No. 169,722

8 Claims. (Cl. 225—21)

My invention relates to machines of the character disclosed in the copending application filed by myself and Otto M. Eash on September 22, 1934, under the title "Dispensing machine", and bearing Serial No. 745,077. The present device relates to means for dispensing liquids in predetermined quantities in response to individual actuation of the dispenser, but is especially directed to an improved form of the device disclosed in the mentioned copending application.

An object of the invention is to provide a machine for dispensing beverages such as buttermilk, tomato juice, pineapple juice and the like.

Another object of the invention is to provide a machine for dispensing a container, such as a cup, which has freshly been filled with a beverage.

Another object of the invention is to effect the filling of the cup within view of the purchaser but screened from contact by the purchaser until such time as the cup is filled.

Another object of the invention is continually to condition the beverage, preferably by aeration, whether it is actually being dispensed or not.

A further object of the invention is to provide an automatic dispensing mechanism which can cause no injury to a user.

The foregoing and other objects are attained in the embodiment of the invention shown in the drawings, in which—

Fig. 2 is a side elevation of the mechanism shown in Fig. 1.

Fig. 3 is a cross-section the plane of which is indicated by the line 3—3 of Fig. 2.

Fig. 4 is a cross-section showing in side elevation part of the spout actuating mechanism.

Fig. 5 is a cross-section the plane of which is indicated by the line 5—5 of Fig. 3.

Fig. 6 is in part a cross-section and in part a side elevation showing the relationship of the gate actuating mechanism.

Fig. 7 is a detailed side elevation showing the mechanism for controlling the cup.

Fig. 8 is a schematic cross-section showing in plan the operation of the spout.

Fig. 9 is a fragmentary detail showing a cam mechanism for the cup-releasing mechanism and the gate.

Fig. 10 is a side elevation showing the interconnection of the coin mechanism.

Figure 1:
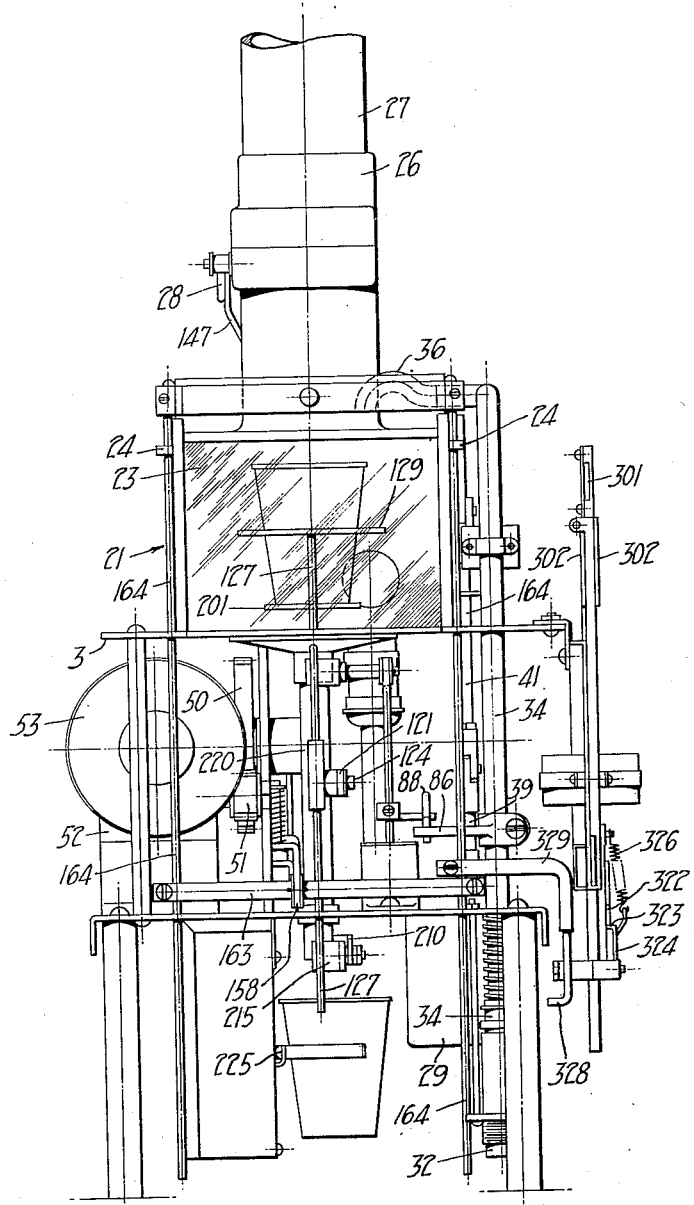
Fig. 1 is a front elevation of the principal mechanism of the dispensing machine constructed in accordance with my invention.

In its preferred form, the dispensing machine of my invention comprises means for conditioning a beverage for dispensation, that is, aerating it, chilling it and agitating it, together with means actuated in response to a predetermined impulse, such as the introduction of a coin into the machine, for setting into motion mechanism for releasing a container such as a cup, filling the container with a predetermined amount of the beverage, and then rendering the filled cup accessible for withdrawal from the machine, all combined with mechanism effective after withdrawal of the filled cup from the machine, for restoring the parts to their original condition ready for a subsequent cycle of operation.

While the dispensing machine of my invention is of course susceptible of embodiment in various different forms, I have illustrated it herein as it has been successfully constructed in order to display and dispense fruit juice. Such beverages are in best condition for consumption when they are chilled somewhat from ordinary room temperature, and are further peculiar in that they usually contain sufficient solids that continuous agitation is desirable in order that the homogeneity of the beverage can be maintained. Furthermore, upon standing they tend to lose their flavor and apparent freshness, so that some treatment is desirable in order that they can be maintained in optimum condition for consumption over protracted time periods.

Since the general framework of a suitable dispensing machine, together with the refrigeration or cooling mechanism and miscellaneous storage space, is well shown in the above-identified copending application, and since the present device is not concerned with such parts of the complete structure, they are not disclosed or described in detail herein. It is sufficient to say that it is preferred that there be provided, in some standard fashion, a means for maintaining a suitable supply of the beverage to be dispensed, at a proper temperature.

In the upper portion of whatever enclosure or cabinet is utilized, there is encompassed a main compartment 19 from which there is segregated a dispensing compartment 21 bounded by a metal wall 22 and closed by a gate 23, preferably of glass, which can rise and fall in guides 24 so that the compartment 21 can be connected with or isolated from the exterior of the enclosing cabinet. Located just above the compartment 21 is a standard cup-dispensing reservoir and mechanism 26, of which various types are commercially available, so that the mechanism is not described in detail. Suffice it to say that the mechanism 26 includes a column 27 for paper cups and is provided with an actuating lever 28 which, when afforded a complete oscillation, dispenses a single cup and restores the mechanism to condition for a subsequent operation.

In accordance with my invention, the beverage supply is continually circulated and aerated in order that it may be maintained in a palatable and homogeneous condition, but upon actuation of the machine a predetermined portion is dispensed into a cup situated within the compartment 21, after which the gate 23 is lifted so that the cup can be withdrawn. Following this operation, the machine is restored to original condition. To circulate the beverage, therefore, there is provided a pump of any suitable character, there being illustrated in Fig. 2 a displacement pump, generally designated 29, communicating through a pipe 31 with a connection 32 extending to the beverage reservoir and provided with a suitable nonreturn check valve. The pipe 31 likewise connects with an outlet 34 having a suitable check valve to prevent return flow and extending into the upper compartment 19 to terminate in a spout 36.

Within the pump 29 is a piston (not shown) fastened on a piston rod 39 to which a pitman 41 is pivoted. The pitman is connected to one end of a walking beam 42 fulcrumed on a central support 43 secured to the framework 3, and at its opposite end connected by a rod 44 to an eccentric 46. A through-shaft 48 carries the eccentric 46 and is journaled in bearings 49 in a casting 45. The shaft 48 also carries a master gear 50 with which meshes a pinion 51 connecting through a suitable speed reducer 52 to a source of power, such as an electric motor 53. Upon energization of the electric motor, the shaft 48 is rotated and, through the intermediate mechanism, the pump 29 is operated, thus circulating beverage from the inlet 32 through the outlet 34 and the spout 36. A return circuit is normally provided by a return tube 54 which leads to the beverage container. Since the motor 53 is continually energized during the operation of this structure, there is a continual circulation of the beverage to be dispensed, to maintain its condition uniform. Furthermore, the return tube 54, being somewhat larger than and spaced from the outlet of the spout 36, is effectively utilized to entrain air with the returning beverage so that the beverage is continually aerated during its circulating cycle. This aeration is effective to maintain the taste and character of the beverage uniform, even though it may have been in the machine for a protracted period.

When a drink is to be dispensed, a coin is introduced into a coin slot 301 of a coin mechanism, various different types of which can be utilized, the major part of the one shown being as disclosed in Patent No. 2,057,737, issued October 20, 1936. The coin travels through the coin mechanism, past rejecting gates 302 for discarding spurious coins. These gates are actuated by levers 303 connected by a link 304 to a movement plate 306 mounted on the coin mechanism. Movement of the plate 306 about a pivot point 307 is afforded by a connecting spring 308. One end of the spring is joined to a block 309 which is connected at one side of the axis of the spring to a driving pin 311 on the eccentric 46. Similarly, the other end of the spring 308 is connected to a block 312 joined by a pin 313 to the plate 306 at a point to one side of the axis of the spring 308. If the mechanism should jam, the spring 308 buckles or flexes until the jamming or stoppage is rectified and at the same time transmits the desired amount of force, despite minor misalignment and minor operating discrepancies.

A coin 314 which has passed the gates 302 descends in a slot 315 to lie against a slide 316 which is connected to the driving plate 306. At an appropriate time in the operation of the eccentric 46, the slide 316 is periodically withdrawn, the coin 314 falls gravitally behind a lip 317 on a lever 318 and is subsequently propelled toward the left in Fig. 10 by return movement of the slide 316. The forward movement of the coin 314 depresses the lip 317 and rocks the lever 318 in a counter-clockwise direction, as seen in Fig. 10. The coin continues through a chute 319 to a suitable receiving container (not shown). Movement of the lip 317 downwardly not only moves the lever 318 but likewise, by engagement of the lip 317 with a pivoted latch plate 321, moves the latch plate so that a tooth 322 at one end thereof displaces and subsequently lies under a leg 323 on a latch 324. By operation of springs 326 and 327 the tooth 322 is held under the lip 323; hence the mechanism cannot be again actuated by a subsequent coin until such time as a hook 328 at the bottom terminus of a rod 329 extending from the gate 23 and operated in accordance therewith, has overridden a lever 331 projecting from the latch 324 and released the tooth 322 from below the lip 323 so that the plate 321 could be restored to its original position in which the construction 317 is again in the path of a coin 314.

Rising movement of the lever 318 causes a pin 332 on a shaft 333 to move in an anti-clockwise direction. The shaft 333 carries a lever 334 connected to a latch lever 66 (see Fig. 4). The latch lever in turn is connected to a lever 67 pivoted to control a unicycle clutch. The clutch includes a lug 68 extending from the driving shaft 48 and which is engageable by a bell crank 69 having a pawl 71 at one end and an arcuating arm 72 at the other end. When the lever 67 is lifted, the pawl 71 is enabled to engage with the lug 68 as the shaft 48 rotates under the influence of the motor 53, so that the disc 73 to which the bell crank is pivoted by the pin 74 is then joined to the shaft 48 and the two rotate in unison pending release of the pawl 71.

This type of clutch and holding mechanism is utilized in order that the pump may be synchronized with the remaining operations of the machine. The clutch is so related that the pump has completed about half of its suction stroke when the disc 73 is coupled to the driving shaft 48.

Further rotation of the shaft 48 causes unitary rotation therewith of the disc 73, whereupon a cardioid cam groove 81, stamped in the reverse face of the disc 73, is effective to oscillate a lever 82 pivoted on the casting 45 and carrying a cam follower pin 83 riding in the groove 81. The lever 82 connects through a link 84 with a radial arm 86 on the discharge pipe 34, so that the pipe is rotated sufficiently to swing the spout 36 from the full-line position shown in Fig. 8 into the dotted-line position shown in that figure in which it projects through an aperture 87 in the cup support 26 and into a central position above a cup previously deposited in the dispensing chamber 21. The timing is such that at about the time the spout is centrally located over the cup, the pump 50 begins its discharge stroke and discharges a volume of beverage into the receiving cup. At the conclusion of the discharge stroke of the pump, the cam groove 81 is effective upon the lever 82 and the link 84 to swing the spout 36 back through the aperture 87 into the full-line position shown in Fig. 8. Any drip from the spout is caught by the tube 54 and is returned to the beverage reservoir.

In accordance with the mechanism I have so far described, one cycle of operation of the pump is effective to discharge the beverage into a receiving cup rather than back into the storage tank.

During the rotation of the disc 73, and at about the time the pump begins to discharge beverage into the waiting cup, a cam 101 is effective to rock a lever 102, provided with a roller follower 103, thereby oscillating a shaft 104 on which the lever is mounted. Oscillation of this shaft produces oscillation of a lever 106 which is joined by a link 107 to a comparable lever 108 pivoted, as at 109, to the casting. This movement lifts the lever 108 to permit a clutch lever 111, pivotally mounted on a disc 112 by a pin 113, to engage with a driving lug 114 carried on the shaft 48 to engage a pawl 17 located at the extremity of the lever 111.

When the disc 112 is coupled to the driving shaft, a cam groove 118, stamped in the reverse face of the disc 112, is effective upon a follower pin 119 carried by a two-part lever 121. One end of this lever is pivoted by a pin 122 to the casting, and the other end is provided with a slot 123 encompassing a pin 124 carried by a yoke 126. A pair of rods 127 and 128, respectively, slidably mounted in the framework of the machine, are joined by the yoke 126 and by a cup guiding ring 129. The shape of the cam groove 118 is such that when the disc 112 is rotated the lever 121 is actuated to lower the cup ring 129 against the framework of the mechanism during the first half of such rotation.

If for any reason the ring 129 should be obstructed in its lowering movement, there is provided a yielding or buckling means in the lever 121. This takes the form of the two parts of the lever, the parts being connected by a pivot pin 131 and by a spring 132 which is confined between a perforated lip 133 on one part of the lever and a fastening device 134 at the extremity of a through pin 136 piercing an ear 137 on the other portion of the lever.

Operating in conjunction with the disc 112 is a pin 141 which operates in the cam groove 118 and is effective to oscillate a lever 142 in opposite directions. This lever arm is provided with a fulcrum 144 on the main framework of the mechanism, and has an upper arm 143 provided with a pin 146 extending through a loop 147 at the end of the rod 28 for actuating the standard cup dispenser. The location of the pin 141 in the groove 118 is such that during the first half rotation of the disc 112 there is no effect upon the lever 143, but during the last half of the rotation of the disc the actuator 28 is given an oscillatory cycle in order to release a single cup and to return to original position.

Also mounted to turn with the disc 112 is a cam disc 154, particularly shown in Figs. 3 and 6, which carries a cam groove 156 within which operates a follower pin 157 projecting from a lever 158, one end of which is mounted on a pin 122 projecting from the framework of the machine and the other end of which is provided with a slot 161 encompassing a pin 162 projecting from a crosshead 163 in turn joining a pair of parallel rods 164 slidably mounted in apertures in the main framework of the machine and at their upper end joined to the gate 23.

During the first half of the rotation of the disc 154, the gate 23 is lifted to afford unobstructed access from the exterior into the compartment 21. The reverse movement of the gate 23 occurs during the latter half of the rotation of the disc 154, so that the gate is returned to closed position cutting off connection from the exterior to the compartment 21.

In the event an obstruction should present itself beneath the gate 23, there is provided a yielding means for precluding injury to the obstruction and to the mechanism. This comprises a spring 167 which is confined between an ear 168 on one part of the lever 158 and a fastening means 169 carried on a bolt 171 mounted on an ear 172 projecting from the other portion of the lever 158. Since the two parts of the lever are connected by a pivot pin 173, there is afforded a yielding connection, which permits buckling of the lever under urgency of a force superior to that of the spring 167.

When the cam 101 contacts the roller 103 and, through the lever 102, oscillates the shaft 104, not only is the lever 108 lifted to cause engagement of the clutch pawl 117, but likewise the lever 106 is lifted thereby interposing a projection 174 in the path of the arm 111. When the disc 112 makes approximately one-half of a rotation, the lever 111 contacts the projection 174 and the pawl 117 is withdrawn from the lug 114, thereby disengaging the driving shaft 48 from the discs 112 and 141. Both of these discs therefore make a half rotation before they are interrupted in their movement. Also at the time the levers 106 and 108 are originally lifted, a shoulder 177 on the intermediate link 107 lodges on a latch lever 176. This mechanism therefore latches or holds the discs 112 and 141 in half cycle position indefinitely.

In order that the operation of the machine will not be completed until such time as a filled cup has been manually removed from the compartment 21, but will complete its operation promptly after such removal, there is provided means responsive to the weight of a filled cup for governing the operation of the clutch levers 106 and 108. To this end, the bottom of the compartment 21 is provided with a platform 201 which is vertically movable together with supporting rods 202 reciprocable in suitable guides in the framework of the machine. A pin 203 mounted in a crosshead 204 joined to the rods 202 is connected to one end of a lever 208 at its center pivoted on a fulcrum 209 and at its opposite end connected by a link 211 to a bell crank 212. The lever 208 is urged into uppermost position by a coil spring 213, while the bell crank 212 is provided with a pin 214 operating in a slot 216 in the upper end of the lever 176. A lever 210, pivoted on the framework of the machine, connects to a crosshead 215 joined to the rods 202 to provide a parallel motion with the lever 208.

In the event liquid should be spilled within the compartment 21, it drains through a tube 220 into a receiving cup mounted on a lever 225 for actuating an electrical switch 230 which opens the circuit to the electric motor 53 and stops the machine instantly.

As the cup which rests on the platform 201 is being filled, it increases in weight until it overcomes the opposing force of the spring 213, at which time the bell crank 212 is oscillated to bring the pin 214 to the end of the slot 216. The link 107 is positively retained in lifted position, thereby holding the pawl 117 disengaged due to contact between the lever 111 and the pawl 174. When, however, the filled cup is removed from the platform 201, the then superior force of the spring 213 not only removes the pin 214 from the end of the slot 216 but retracts the lever 176 from beneath the shoulder 177, thereby permitting the link 107 and the pawl 174 to become disengaged from the arm 111 and the lever 108 to return to its original position. The discs 112 and 141 are therefore coupled to the driving shaft 48 for further rotation which is substantially a half revolution or until such time as the arm 111 again contacts the pawl on the lever 108 and the pawl 117 is disengaged from the lug 114. During the last half of the rotation of the discs 112 and 141, the ring 129 is raised to an extreme upper position, at which time the cup dispenser is actuated, thereby releasing a cup into the ring which lowers it to an intermediate position while the dispenser is being restored to its normal position. All of this occurs while the gate 23 is being lowered from its upper position to its lowermost position, so that all of the parts are restored to their original position.

In the ordinary operation of the machine, the beverage is continually circulated in order that it can be aerated to maintain its flavor and in order to maintain its homogeneous character. The gate 23 is ordinarily closed, in order to isolate the interior of the machine from its surroundings. A cup is in position ready to receive a charge of beverage and is partially confined by the supporting ring 129. The platform 201 is in a raised position while the spout 36 is returning the circulating beverage to the reservoir and is ejecting the beverage so that it entrains air with it and is aerated as it returns into the tube 54. Upon the introduction of a coin, the spout 36 swings over the cup and discharges a predetermined quantity of beverage thereinto. At the completion of this charging operation the gate 23 rises to afford access to the filled cup which has sunk with the platform 201 to hold the mechanism inoperative for an indeterminate period. In the meantime the spout 36 has returned to its inoperative position, and the supporting ring 129 has descended into contact with the floor of the compartment 21. When the filled cup is withdrawn from the compartment 21, the platform 201 again rises, the gate 23 gradually descends into closed position, the supporting ring 129 rises to its uppermost position and there receives a cup simultaneously released from the dispensing mechanism which is then restored to inactive position. Following this, the supporting ring 129 returns to an intermediate position. The entire structure has then completed a cycle and is ready for a subsequent operation.

I claim:

1. A dispensing machine comprising a cup magazine, means for releasing a cup from said magazine, means for filling said cup with a fluid, and means responsive to failure of said cup to receive said fluid for preventing further operation of said machine.

2. A dispensing machine comprising a normally closed compartment, means including a movable spout for circulating liquid in a circuit outside of said compartment, means for moving said spout into said compartment for discharging liquid therein, and means for entraining air with liquid discharged from said spout outside of said compartment.

3. A dispensing machine comprising a movable spout, means periodically effective in regular cycles during the operation of the machine for discharging liquid from said spout, and means effective to receive liquid discharged from said spout together with entrained air for return to said spout.

4. A dispensing machine including a liquid supply tank, comprising means including a movable spout for circulating liquid from said tank in a closed circuit, means for positioning a cup in a predetermined location, and means for moving said spout to interrupt discharge of said liquid into said cup and to return said liquid to said tank together with entrained air.

5. A dispensing machine comprising a source of liquid to be dispensed, means for circulating said liquid from said source through a circuit returning to said source, a spout, a return pipe in line with said spout and included in said circuit for entraining air therein, and means operating in time with said circulating means for moving said spout and said return pipe out of communication to interrupt the aeration of said liquid.

6. A dispensing machine comprising a source of liquid to be dispensed, means including a spout and a return pipe normally in communication but with an air space therebetween providing a closed circuit for circulation of said liquid from and to said source, means for circulating said liquid through said circuit in successive cycles to entrain air therein from said air space, and means effective between said cycles for moving said spout to interrupt entrainment of air.

7. A dispensing machine comprising a source of liquid to be dispensed, means including a spout and a return pipe normally in communication but with an air space therebetween providing a closed circuit for circulation of said liquid from and to said source, and means for circulating said liquid through said circuit in successive cycles to entrain air therewith.

8. A dispensing machine comprising a cup magazine, means for releasing a cup from said magazine, means below said magazine for supporting said released cup, a return tube extending to a source of liquid, a spout extending from said source of liquid movable from a position over said return tube into a position between said magazine and said released cup for discharging into said cup, and means responsive to discharge of liquid into the space below said magazine but not into said cup for interrupting the operation of said machine.

CHARLES ZOOK SUTTON.